United States Patent
Scott et al.

(10) Patent No.: US 8,959,113 B2
(45) Date of Patent: Feb. 17, 2015

(54) SYSTEM, METHOD AND COMPUTER PROGRAM PRODUCT FOR MANAGING TABULATED METADATA

(75) Inventors: Michael Scott, Washington Grove, MD (US); Tom Trainer, Bethesda, MD (US)

(73) Assignee: Open Text S.A., Luxembourg (LU)

( * ) Notice: Subject to any disclaimer, the term of this patent is extended or adjusted under 35 U.S.C. 154(b) by 0 days.

(21) Appl. No.: 13/431,753

(22) Filed: Mar. 27, 2012

(65) Prior Publication Data

US 2014/0258336 A1   Sep. 11, 2014

(51) Int. Cl.
*G06F 17/30* (2006.01)

(52) U.S. Cl.
USPC .......................................................... 707/783

(58) Field of Classification Search
USPC .......................................................... 707/783
See application file for complete search history.

(56) References Cited

U.S. PATENT DOCUMENTS

| | | | |
|---|---|---|---|
| 6,401,097 B1 | 6/2002 | McCotter et al. | |
| 6,947,959 B1 | 9/2005 | Gill | |
| 7,024,409 B2 | 4/2006 | Iyengar | |
| 7,206,791 B2 | 4/2007 | Hind et al. | |
| 7,318,216 B2 | 1/2008 | Diab | |
| 7,451,157 B2 | 11/2008 | Kaler et al. | |
| 7,693,897 B2 * | 4/2010 | Bugir et al. | 707/707 |
| 2004/0006606 A1 | 1/2004 | Marotta et al. | |
| 2004/0044905 A1 | 3/2004 | Heath et al. | |
| 2004/0199867 A1 | 10/2004 | Brandenborg | |
| 2004/0236745 A1 | 11/2004 | Keohane | |
| 2006/0004815 A1 * | 1/2006 | Murata et al. | 707/101 |
| 2006/0080316 A1 * | 4/2006 | Gilmore et al. | 707/9 |
| 2007/0050467 A1 * | 3/2007 | Borrett et al. | 709/213 |
| 2008/0178198 A1 * | 7/2008 | Gauba | 719/320 |
| 2008/0307343 A1 | 12/2008 | Robert et al. | |
| 2010/0082731 A1 | 4/2010 | Haughay et al. | |
| 2010/0306656 A1 * | 12/2010 | Moloney et al. | 715/723 |

* cited by examiner

*Primary Examiner* — Joshua Bullock
(74) *Attorney, Agent, or Firm* — Sprinkle IP Law Group

(57) ABSTRACT

Embodiments disclosed herein provide systems and methods for managing metadata, including scalar, text, drop-down, type ahead, and tabular metadata related to digital assets. Restrictions may be set at the metadata field level to allow users of different user groups to view fields based on restriction classes. A metadata management tool may allow an administrator to restrict one or more metadata fields associated with a digital asset in a network with a restriction class. The restricted fields may be associated with one or more user groups in the network. Only users in the user groups associated with the restriction class can view the restricted fields, in addition to the digital asset and any unrestricted fields associated therewith. When searching tabular metadata, a 'row oriented' search function may retrieve only assets where the search criteria are matched by a single row.

21 Claims, 9 Drawing Sheets

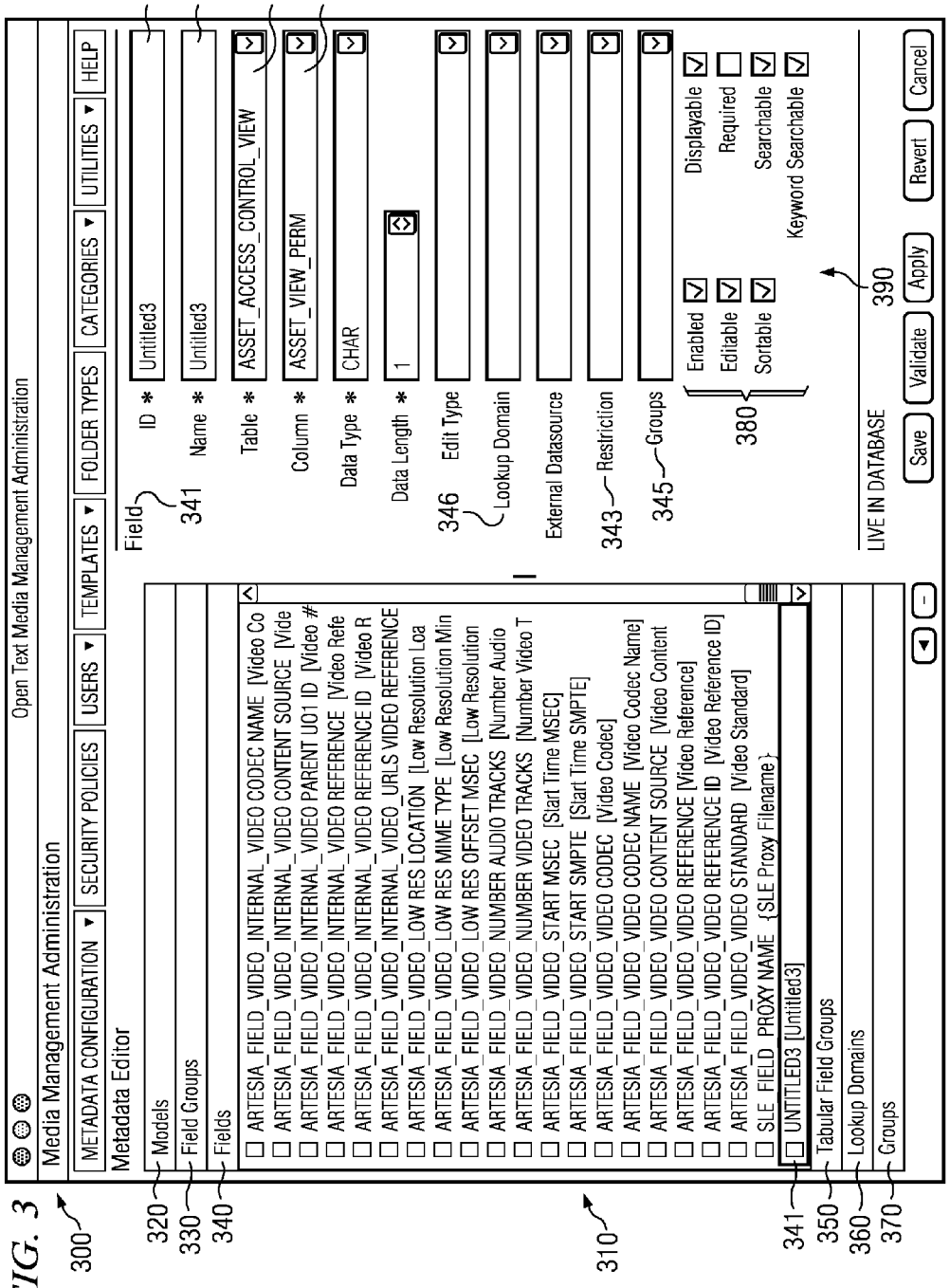

Field ⌒441

| | |
|---:|:---|
| ID * | MM.PGM.FIELD.JOB.NUMBER |
| Name * | Job Number |
| Table * | MD_PROGRAM_ASSETS ⌄ |
| Column * | JOB_NUMBER ⌄ |
| Data Type * | CHAR ⌄ |
| Data Length * | 10 ⇅ |
| Edit Type | SIMPLE ⌄ |
| Lookup Domain | ⌄ |
| External Datasource | ⌄ |
| Restriction Groups | ▓▓▓▓▓▓▓▓▓▓▓▓▓▓ ⌄ |

Restricted Class 1 ⌒ 451
Restricted Class 2 ⌒ 452   ← 450
Restricted Class 3 ⌒ 453

Sortable ☑    Searchable ☑
Keyword Searchable ☑

WORK IN PROGRESS

[ Save ]  [ Validate ]  [ Apply ]    [ Revert ]  [ Cancel ]

*FIG. 4*

SYSTEM, METHOD AND COMPUTER PROGRAM PRODUCT FOR MANAGING TABULATED METADATA

CROSS-REFERENCE TO RELATED APPLICATION(S)

This is a conversion of and claims a benefit of priority from U.S. Provisional Application No. 61/469,508, filed Mar. 30, 2011, entitled "SYSTEM, METHOD AND COMPUTER PROGRAM PRODUCT FOR MANAGING TABULATED METADATA," which is fully incorporated by reference herein.

TECHNICAL FIELD

This disclosure relates generally to digital asset management. More particularly, embodiments disclosed herein relate to a system, method, and computer program product for managing metadata, including tabulated metadata, for digital asset management systems.

BACKGROUND OF THE RELATED ART

Digital asset management (DAM) generally refers to a business process or a software tool for organizing the creation, management, distribution and archiving of digital assets. Specifically, digital asset management may involve the creation of an archive, the development of an infrastructure to preserve and manage digital assets and a search functionality that allows end users to identify, locate and retrieve digital assets.

At its simplest, a digital asset management system may simply involve a set of database records. Each of such database record may represent a digital asset and may contain information about that digital asset. As an example, a database record may contain the name and format of an image file, the date the image file was created, the name of the person who created the image file, and so on. In some cases, the database record may include additional information such as the content of the image file.

While digital media management technologies were once used exclusively by publishing and media companies, they are increasingly being incorporated into content management systems to manage other digital assets such as photos, music, videos, animations, podcasts and other multimedia content. These technological advances continue to bring challenges to business operations management. Consequently, there is always room for innovations and improvements.

SUMMARY OF THE DISCLOSURE

With the growing use of media, it is increasingly important for an entity to have the ability to manage their digital assets efficiently and effectively. Within the context of this disclosure, an asset may refer to a media management object having both editorial content and a description of the content properties. An asset may also be referred to as a Unit of Information (UOI).

Embodiments disclosed herein provide a system, method, and computer program product for managing metadata associated with digital assets, including tabulated metadata. In some embodiments, metadata management functions disclosed herein can be implemented as part of a digital asset management system, a content management system, a media management system, or the like.

A system may include one or more computing devices and at least one non-transitory computer readable medium storing instructions translatable by the one or more computing devices to perform media management functions. At least one of the media management functions may be a metadata editor. The metadata editor may have a first component configured to provide a user with access to configure one or more metadata fields stored on the one or more computing devices, a second component configured to provide security to one or more selected metadata fields, and a third component configured to define access rights associated with the one or more selected metadata fields for one or more user groups. The second component may be configured to receive an instruction to apply a restriction to the one or more fields and associate the one or more fields with the restriction. The third component may be configured to receive an instruction to allow one or more user groups to the selected one or more metadata fields and associate the one or more user groups with predetermined access rights.

At least one of the media management functions may be a search function configured to search one or more types of metadata. The search function may be a keyword search function, wherein searching one or more types of metadata comprises searching the one or more metadata fields to identify at least one metadata field having a keyword and returning a set of the one or more metadata fields based on access rights associated with one of the one or more user groups. The search function may be a field search function, wherein searching one or more types of metadata comprises selecting one or more metadata fields based on access rights associated with one of the one or more user groups and searching the selected one or more metadata fields. The media management functions may further comprise a lookup domain function configured to provide a user with a selected list associated with at least one of the one or more fields.

A system implementing metadata management functions disclosed herein may comprise a media server and a database. The media server may be configured to store a set of digital assets and the database may be configured to store metadata records associated with a digital asset in the set of digital assets, each metadata record including a set of fields. At least one of the set of fields may be configured by an authorized user or a system administrator as restrictable. A restricted field may be applicable to a particular group or groups of users in a network environment based, for instance, on their role or roles. A restricted field may still be searchable and a digital asset having one or more non-restricted fields matching a search request may still be viewable. However, the restricted field will not be viewable to the particular group or groups of users.

In some embodiments, the search function may be integrated with an application programming interface and/or a search engine. For example, in response to a search request from a user at a client device, an application programming interface may operate to filter out restricted fields that the user is not permitted to view and allow the user to view non-restricted fields and any restricted field that the user is permitted to view. The user may be associated with a first group of users from which viewing of a certain restricted field or set of restricted fields is not permitted. As another example, a search engine may identify from an index a plurality of metadata records containing information matching at least one search parameter in a search query. In one embodiment, suppose the user is in a first group, only fields that are not restricted from viewing by the first group are searched and a subset of those unrestricted fields found to contain information matching the at least one search parameter is presented to the user. In one embodiment, all of the fields of plurality of metadata records are searched to find a global list of fields containing information matching the at least one search parameter. From the global list of fields, only those fields that are not restricted from being viewed by the user are presented to the user.

In some embodiments, the search function may implement a 'row oriented' approach when searching against multiple fields from the same tabular metadata table that are part of an asset's metadata. Instances found by a text search engine are indexed with field instance numbers and processed to determine potential matches utilizing the field instance numbers. In this way, the search function retrieves only assets where the search criteria are matched by a single row. This can be performed in real time and can provide results that are much more relevant to each particular search query.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 3 depicts a graphical representation of a user interface, illustrating one embodiment of a media management tool;

FIG. 4 depicts a graphical representation of a metadata field, illustrating an example of field security and how a field can be restricted;

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices.

Figures 1, 2:
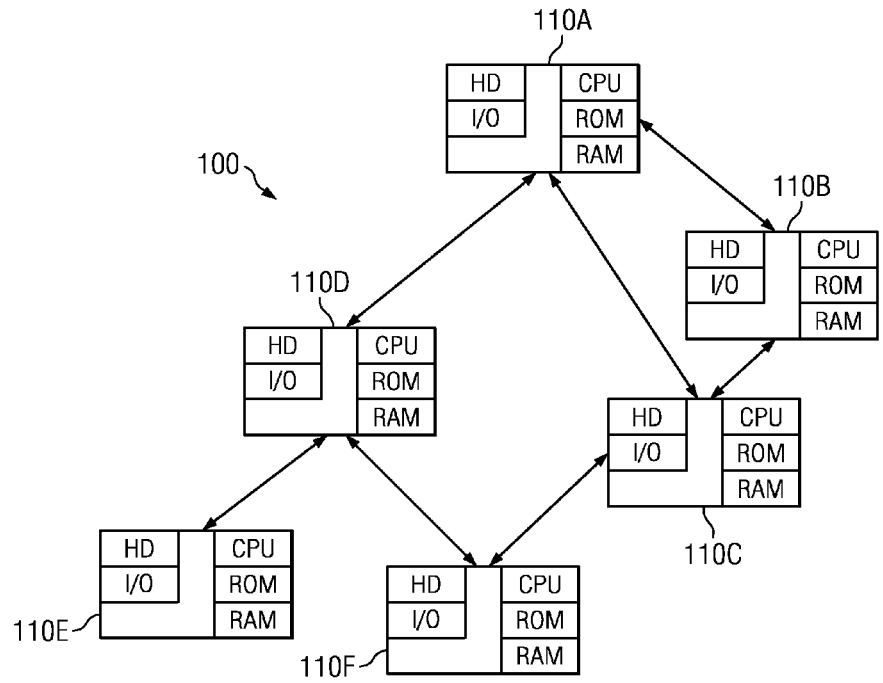
FIG. 1 depicts a schematic drawing depicting an exemplary network environment in which embodiments disclosed herein may be implemented.
FIG. 2 depicts a graphical representation of a user interface (UI), illustrating one embodiment of a metadata management function.

Before discussing embodiments of the invention, a hardware architecture where embodiments disclosed herein can be implemented is described with reference to FIG. 1. In FIG. 1, network 100 may represent a private network, a public network, or a virtual private network (VPN). A company's intranet might be an example of a private network and the Internet might be an example of a public network. A VPN uses primarily public telecommunication infrastructure, such as the Internet, to provide remote users with a way to access an internal network of an organization or entity. Network 100 might be an example of an internal network of a business entity. Various types of networks are known to those skilled in the art and thus are not further describe Network 100 can be bi-directionally coupled to a variety of networked systems, devices, repositories, etc.

In the example shown in FIG. 1, network 100 comprises a plurality of computers and/or machines 110A-F. Computers 110A-F may comprise at least a server machine and a client machine. Virtually any piece of hardware or electronic device capable of running client software and communicating with a server can be considered a client machine. As an example, each of computers 110A-F may include a central processing unit ("CPU"), at least one read-only memory ("ROM"), at least one random access memory ("RAM"), at least one hard drive ("HD"), and one or more input/output ("I/O") device(s). The hardware configuration of computer 110A can be representative to other devices and computers alike in network 100 (e.g., desktop computers, laptop computers, personal digital assistants, handheld computers, cellular phones, and any electronic devices capable of storing and processing information and network communication). Computer 110A may be a workstation. In some embodiments, computer 110A may be configured to run Internet Explorer®, Safari®, Firefox®, Flash 10®, or other Web browsing application(s).

In some embodiments, computer 110A may communicate with one or more server computers 110B-110F. Computers 110B-F may implement an embodiment of a system disclosed herein and may connect to computer 110A in network 100. In some embodiments, computer 110A may send a request to one or more computers 110B-F. In response, computers 110B-F may send requested information to computer 110A and computer 110A may operate to cause a response to be displayed on computer 110A. As an example, a digital asset management (DAM) system may be implemented on one or more computers 110B-F for managing digital assets in network 100. A user at computer 110A may be permitted to access certain digital assets managed by the DAM system.

As discussed above, there is an increasing need to manage digital assets such as photos, music, videos, animations, podcasts and other multimedia content for businesses and corporations alike. Traditionally, a digital asset management system may employ database records, each containing information about a particular digital asset. The term "metadata" generally refers to data that describes other data, and can be used to summarize basic information about a file to make finding and working with particular instances of that file easier. This type of metadata may be referred to as file metadata. Author, date created and date modified and file size are examples of basic file metadata. Having the ability to filter through that metadata can make it much easier to locate a specific file.

Metadata can be created manually (also referred to as custom metadata), or by automated information processing (also referred to as system metadata). Manual creation tends to be more accurate, allowing the user to input any information they feel is relevant or needed to help describe the file. Automated metadata creation may be more elementary, usually only displaying information such as file size, file extension, when the file was created and who created the file.

Embodiments disclosed herein may be particularly useful for managing metadata associated with digital assets (also referred to as asset metadata). The asset metadata, including system-defined metadata and custom metadata, can be highly structured and can be projected into rows and columns. In some embodiments, a media management system database stores properties associated with assets, including content-specific attributes (these attributes describe most of the asset types, such as text documents, XML documents, images, layouts, videos, and generic multimedia objects), generic attributes (these properties' fields include generic columns of Character, Date and Numeric data types associated with each asset), and predefined associations (these include assignments of vocabulary control terms, rights and permissions, links, etc.).

Referring to FIG. 1, in some embodiments, a media server may communicate with a workstation or other client computer 110A to provide digital assets, for example, audio and video content. In some embodiments, computer 110B may function as a media server for providing streaming or downloading of audio or video content to users in or outside of network 100. In some embodiments, computer 110B may operate Adobe Flash Media Server (FMS), Microsoft Internet Information Server (IIS) or Apache application to allow audio or visual content to be streamed or downloaded to computer 110A.

In some embodiments, a media management server may communicate with media server 110B or workstation 110A to allow a user to upload, modify, review, delete or otherwise manipulate media. In some embodiments, computer 110C may implement a media management server. In some embodiments, the media management server may operate Open Text Media Management v7.0.0, Open Text LLDS Search, JBoss 4.2.2 from RedHat, or Java Development Kit (JDK) 5.0, which may be "stand alone" or bundled with other applications and programs.

In some embodiments, computer 110D may implement an Enterprise Process Server (EPS) and may communicate with a workstation and a database server. In some embodiments, computer 110D may implement a User Management Server (UMS). In some embodiments, an EPS or UMS computer may contain a plurality of software modules or components implementing a variety of functions as well as tools. For example, an EPS or UMS computer may be configured with Java Development Kit (JDK) 5.0 for writing applets and applications, Tomcat v5.5 from Apache Software Foundation for rendering Web pages, JBoss v.4.2.2 from RedHat for developing and deploying enterprise applications, Microsoft® Management Console v.3.0 for creating, saving, or opening collections of administrative tools, Microsoft® .NET 3.0 for programming, developing, and building Web services and other distributed systems, Microsoft® Internet Information Server (IIS) for building and administering Web sites, search engine(s), and providing support for writing Web-based applications that can access databases, and so on.

In some embodiments, a transcode server may communicate with an enterprise process server to transcode audio and video content. In some embodiments, computer 110E may implement a transcode server for transcoding, interpreting, reformatting or otherwise adapting digital files so that content can be accessed or viewed on different types of playback devices. Transcoding may be performed on audio or visual files. In some embodiments, computer 110E may include Rhozet Carbon Coder/Server.

In some embodiments, a database server may communicate with a media management server or an enterprise process server to store information. A database server may store information in tabulated form. In some embodiments, computer 110F may implement a database server.

As one skilled in the art can appreciate, the exemplary architecture shown and described herein with respect to FIG. 1 is meant to be illustrative and not limiting. Further, embodiments disclosed herein may comprise suitable software including computer-executable instructions. As one skilled in the art can appreciate, a computer program product implementing an embodiment disclosed herein may comprise one or more non-transitory computer readable storage media storing computer instructions translatable by one or more processors in network computing environment 100. In an illustrative embodiment, some or all of the software components may reside on a single computer or on any combination of separate computers.

With that in mind, turning now to metadata management functions for managing tabulated metadata for digital assets in a network environment. Within the context of this disclosure, tabulated metadata refers to tabular data about a digital asset in a media management system, digital asset management, or the like. For tabular or tabulated metadata, more than one database record can be associated with a given data element of the metadata (see e.g., FIG. 10). This allows a list of similar data items to be stored. Tabular data therefore can be useful when there is a one-to-many relationship between an asset and the metadata field values. For example, a table of metadata titled "Actors" might have fields for an actor's first name, last name, contract number, and agency. Any number of actors may be associated with the media content, and the tabular or tabulated metadata would contain each field associated with each actor. Any one of the fields can be set as required for the metadata record, while others can be set as being optional. In the example of "Actors," the first name, last name and contract number may all be required fields, but the agency name may be optional.

In some embodiments, a media management tool may include a sophisticated search function that can ensure data found by a search engine exist in the same row or otherwise corresponds to the same record. For example, suppose a table has two columns, first name and last name, and two rows of data. The first row may have "George" for a first name and "Washington" as a last name; the second row may have "Abe" as a first name and "Lincoln" as a second name. If the user searches for First Name="George" AND Last Name="Lincoln" the user does not expect that the asset that records these names ("George Washington" and "Abe Lincoln") will be returned. However, text search engines will simply return all instances containing either search parameter and thus in this example will return both records. To address this issue, the media management tool implements a 'row oriented' approach to searching tabular metadata fields.

In some embodiments, 'tabular metadata' indicates that there are multiple rows in a relational database management system (RDBMS) table that are part of an asset's metadata. When indexing tabular metadata in a text search engine, each column of the table is indexed in a separate multi-valued search field. For example, an asset may have tabular metadata with the columns FIRST_NAME, MIDDLE_NAME, and LAST_NAME that look like this:

| FIRST_NAME | MIDDLE_NAME | LAST_NAME |
|---|---|---|
| William | Jefferson | Clinton |
| Barack | | Obama |
| George | W | Bush |

In a text search engine, this would be indexed as follows:
<first_name>William</first_name>
<first_name>Barack</first_name>
<first_name>George</first_name>
<middle_name>Jefferson</middle_name>

The desired behavior when searching against multiple fields from the same tabular metadata table is to only retrieve assets where the search criteria are matched by a single row. This 'row oriented' approach may comprise indexing for each field instance an instance number, adding an operator to merge the results from the first name search and the last name search and checking to see if the occurrences have any potential matches based on the field instance number. Thus, when searching for first_name=William AND last_name=Bush against the above example tabular metadata, the search function performing this 'row oriented' searching should not retrieve this asset, even though there is an occurrence of William in the first_name field, and an occurrence of Bush in the last name field. Since these results do not occur in the same 'row', the asset is not retrieved. The search function can be configured to perform this 'row oriented' searching in real time and provide results that are much more relevant to each particular search query.

In some embodiments, metadata management functions may include a lookup domain function. A lookup domain provides a set of lookup values for a field that may be shared among fields, for example, a list of roles may be created in order to associate a role with each member of a movie production (e.g., videographer, director, producer, grip, etc.). The roles are limited to a specific set, forcing the user to use only the list of options provided, and also gaining efficiency since the user does not have to key in the value to be specified. A lookup domain may include common lookups like "Yes/No" defined once and shared among fields, or a lookup domain may come from an external source or be programmatically determined by defining a custom plug-in. A lookup domain may be cached on a domain-by-domain basis.

In some cases, it may be desirable to have an ability to allow lookup domain values expire over time. For example, a commercial product may be distributed via warehouses located in U.S. Cities (e.g., New York, Tuscaloosa, Omaha, Chicago and Denver). As the business evolves, additional warehouses may be added, but also some distribution warehouses may be closed. In this case, an entry in the list of options must be expired. By expiring a list entry, that value can no longer be associated with a product, yet it can continue to be stored in a data record associated with the product asset. Thus, in some embodiments, the domain lookup function may be configured to allow a user to specify the life cycle of lookup domain values.

FIG. 2 depicts a graphical representation of an example of user interface (UI) 200 implementing one embodiment of a lookup domain function. In this example, UI 200 is configured to allow a user to specify values, for example, validation dates 210, 220 ("Nov. 1, 2010" and "Nov. 30, 2010") and domain value 230 "North America," specifying that a certain asset (ID not shown) may be active from Nov. 1, 2010 to Nov. 30, 2010 in North America. Other use cases are also possible.

UI 200 may be implemented as part of a media management tool. This media management tool may be configured to perform a plurality of metadata management functions including a Metadata Editor. The Metadata Editor may comprise a set of functional features that can allow an authorized user or system administrator to configure, model, and otherwise manage metadata in various ways. For example, an administrator may define limitations, including temporal limitations, for metadata field values. As another example, an administrator may specify that an ad campaign may be distributed to certain markets.

The Metadata Editor may allow authorized users such as an administrator to create, modify, and import metadata configurations for use within a media management system. In one embodiment, the Metadata Editor may use a "sandbox" approach—that is, metadata configurations can be created and modified in a staged working area without impacting the current system's configuration. Administrators can make changes to the new metadata configuration, save it, and come back to it at a later time still without affecting the configuration currently active in the database. When the metadata editor is running, it will display informational text denoting whether the configuration that is currently being edited was loaded from the database ("LIVE IN DATABASE") or from the staged working area ("WORK IN PROGRESS"). Changes made to the configuration are not saved to the working area until a user clicks (selects) the Save button. Administrators can also run a verification command to identify all errors in the new configuration. Then, during an appropriately planned off-hours period, the administrator can initiate the process of updating the active system with the metadata configuration. This process may log all users off the system, prevent new logins, and complete all tasks associated with activating a metadata configuration. In the case of trying to apply a new configuration with errors in it, the system may automatically revert back to the previous active configuration, allowing the administrator the capability to correct any errors in the new configuration. In the case of any unintended or unexpected results (not errors), the system may have the capability to revert back to the previous active configuration and allow changes to the new configuration before applying it again. The applied configuration may be archived and the copy may be removed from the staged working area. The next time the metadata editor is loaded, it may load the database version of the configuration.

FIG. 3 depicts a diagrammatical representation of a screenshot of a user interface of a media management tool having a plurality of metadata management functions. In this example, media management tool 300 is configured with a set of main functions including 'Metadata Configuration', 'Security Policies', 'Users', 'Templates', 'Folder Types', 'Categories', 'Utilities', and 'Help' which an authorized user or administrator can access via corresponding menu buttons or tabs. The 'Metadata Configuration' main function may comprise Metadata Editor 310. In this example, Metadata Editor 310 may be configured to provide a set of metadata editing functions, including Models 320, Field Groups 330, Fields 340, Tabular Field Groups 350, Lookup Domains 360, Groups 370, and so on.

As illustrated in FIG. 3, a custom metadata field (e.g., field 341) can be created using Metadata Editor 310. Metadata Field 341 may include configuration parameters such as ID 372, Name 373, Table 374, Column 375, Lookup Domain 346, Restriction 343, Groups 345, and so on. Some of the configuration parameters may be automatically populated. For example, in one embodiment, Column 375 will automatically be populated with a list of available columns for the table chosen in Table 374. Some of the configuration parameters may be optional. For example, if Metadata Field 341 is associated with an external data source, it may be optional to select a column to store this field's value. Some of the configuration parameters may be selectable. For example, an administrator may select a lookup domain for Metadata Field 341 from a list of lookup domains, perhaps defined via Lookup Domains editing function 360. The selected lookup domain is viewable via Lookup Domain 346. In one embodiment, Lookup Domains editing function 360 may implement Lookup Domain UI 200 described above.

An authorized user or administrator may specify additional details or properties 380 in pane 390. For example, an administrator may indicate that Metadata Field 341 is Enabled, Editable, Sortable, Displayable, Searchable, Keyword Searchable, but not Required (i.e., this field does not require that a value be specified when saving new metadata for this field).

In some embodiments, the system may allow an authorized user or administrator to configure a subset of the total set of metadata fields that can be searched across when a 'Keyword' search is performed. As shown in FIG. 3, this can be configured in the Metadata Editor through the 'Is Keyword Searchable' property.

Some embodiments may integrate with a text search engine in which a search field may be created for each metadata field defined in the Metadata Editor. As an example, the text search engine may support the creation of 'macros' to reference a variable number of search fields using a single name. Some embodiments may leverage this feature to create a macro (named 'SC01') for the subset of the search fields that are defined with the 'Is Keyword Searchable' property.

In the absence of any Restricted Field definitions, when a Keyword search is performed, user entered search criteria are searched for in any of the fields configured as keyword searchable, leveraging the SC01 macro created. For example, an end user entered keyword search for the phrase "white house" would generate a search for:

("white house")[SC01]

where [<field list>] is the syntax in the text search engine for restricting the search to specific fields.

When performing a Keyword search, assets should not be retrieved based on occurrences found in fields that are restricted for the user. To accomplish this, before generating the query, some embodiments retrieve a list of all the fields that are restricted for the end user who is performing the search. The text search engine supports a negative field restriction, where a list of fields is provided to indicate what field(s) should not be searched when performing a search. The text search engine also supports nested field restrictions, where multiple field restrictions (either positive or negative) can be applied to query terms and the intersection of those restrictions is applied. Using these features some embodiments may generate a query for:

("white house")[SC01][–<restricted field1>,<restricted field2>, . . . <restricted fieldN>]

where [–<field list>] is the syntax in the text search engine for negative field restriction.

Figure 6:
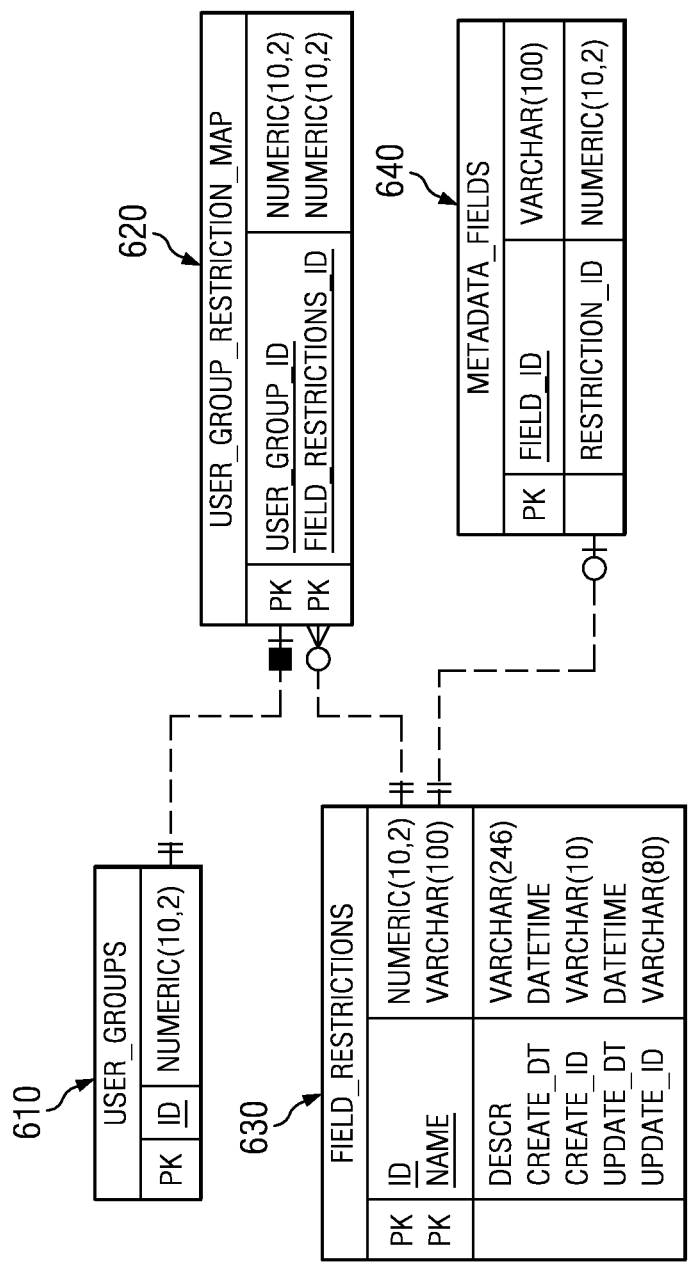
FIG. 6 depicts a diagram illustrating how field restrictions can be applied to different user groups.

In the example of FIG. 3, Restriction 343 may be configured to allow an authorized user or administrator to select a restriction class to apply to Metadata Field 341. In one embodiment, restriction classes are defined in a table, one example of which is shown in FIG. 6. Groups 345 may be configured to allow the administrator to apply the particular restriction class to one or more defined user groups.

For example, as depicted in FIG. 4, the administrator may select "Restricted Class 1" 451, "Restricted Class 2" 452 or "Restricted Class 3" 453 from a drop down menu for Restriction 450 for Metadata Field 441. Restriction classes may be role-based. For example, a manager may have a different set of restrictions than an employee.

This allows security to be selectively applied at the field level. Field level security refers to a scheme for allowing private data to be part of a metadata model of a generally available digital asset, without compromising privacy or security. In this context, Metadata Field 441 can be seen as an example of a restricted field.

Restricted fields are fields that have been restricted to being viewed by specified user groups. For example, a digital asset may be associated with a Salary field which all user groups are restricted from viewing the Salary field except for the Human Resources (HR) User Group. Note the digital asset and non-restricted fields associated therewith may still be viewable by various user groups, subject to applicable restriction classes.

In one embodiment, the process of applying restricted fields to a user group is a two-step process:

First, a field is restricted with a restriction class (which is done at Restriction 343 in the example of FIG. 3). Following the HR example above, the Salary field is restricted to the 'HR only' restriction class. However, at this point, no one can view the Salary field because no User Group has the 'HR only' restriction class applied to it.

Second, the restriction class is applied to a user group. So, in the above HR example, the 'HR only' restriction class is applied to the 'HR User Group'. Now, the only users who can view the Salary field are those who belong to the HR User Group.

In this way, a digital asset can have certain metadata fields restricted from viewing by end users who do not have the proper privilege or access rights, while the content of the digital asset and other metadata associated therewith may not be restricted. This function allows an administrator to tailor what particular information (fields) on a digital asset a user can view and/or search. In some embodiments, a metadata field can be tagged as unrestricted or restricted. In some embodiments, different restriction classes may be defined and a field that is tagged as restricted may be associated with a certain restriction class. This allows different access rights to fields be imposed on different user groups. For example, if Metadata Field 341 is identified as in Restriction Class A, a user group cannot see that field unless the user group is given access to Restriction Class A fields. A user group that does not have the right to access this restricted field may still be able to view the content and other unrestricted fields, but not able to view nor search on the metadata fields that are restricted.

A search function in an embodiment of a digital asset management system disclosed herein may filter metadata based on one or more restrictions. In some embodiments, a query is performed at start up or login of the DAM system to identify all the fields to which a user has access. In some embodiments, the system waits until a user requests access to a field before verifying whether the user can access the field. In some embodiments, the one or more restrictions can be applied at the group level. For example, when a user search query contains a search parameter pertaining to a restricted field or a keyword thereof, the system can check to see what group or groups does the user belong and what field restrictions are applicable to the user's group(s). A user may belong to one or more groups and all field restrictions applicable to those user groups would be applicable to the user.

Figure 5A:
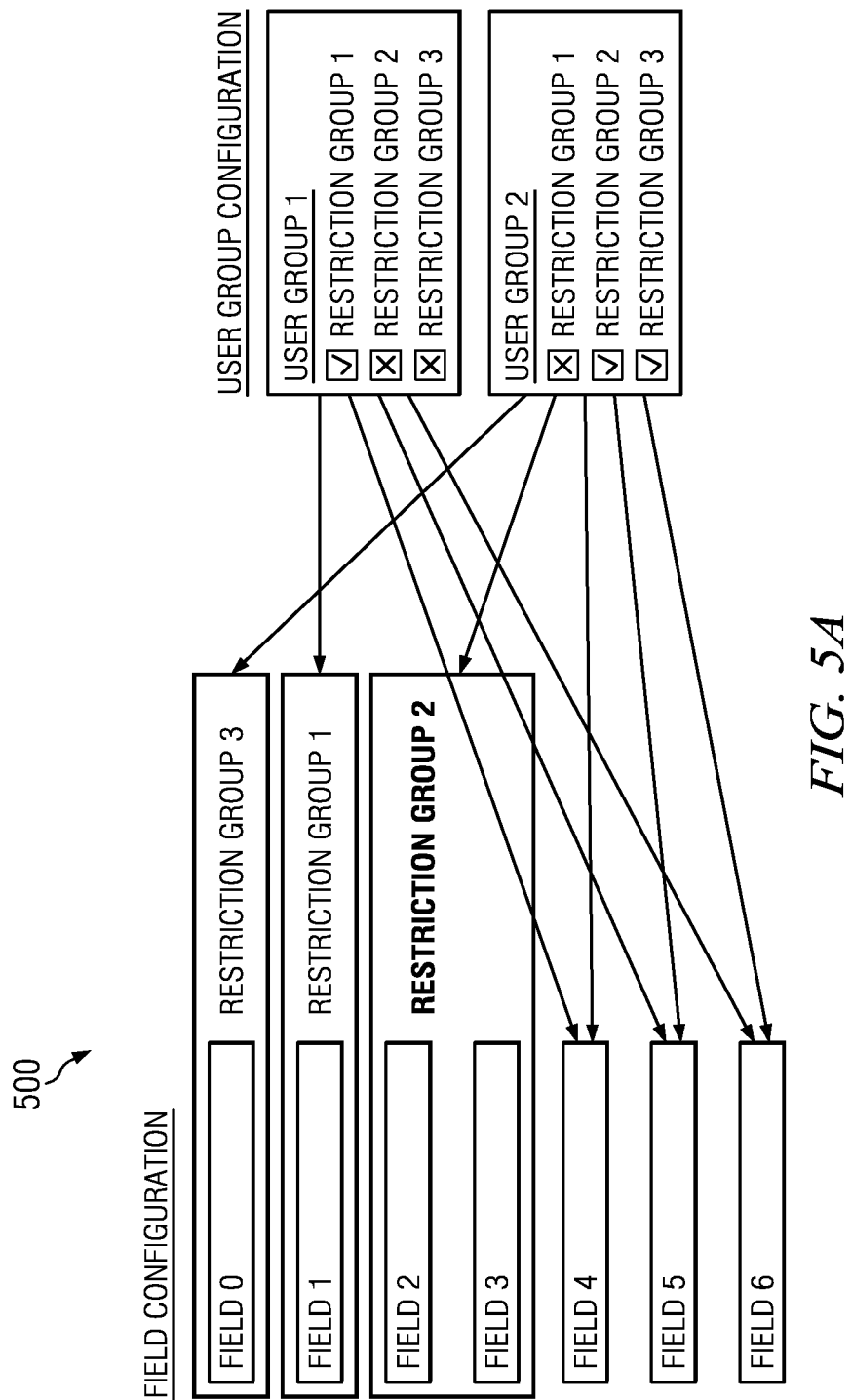
FIG. 5A depicts a diagram illustrating possible implementation of field level security for various fields having different access restrictions.

FIG. 5A depicts a diagram illustrating possible implementation of field level security for various fields. Asset 500 may have a set of metadata fields 0-6. Field 0 may be associated with Restriction Group 3; Field 1 may be associated with Restriction Group 1; Fields 2 and 3 may be associated with Restriction Group 2; and Fields 4-6 may not be associated with any Restriction Groups. In this example, the term 'Restriction Group' is used interchangeably with 'Restriction Class'. Restriction Group 1, but not Restriction Groups 2 and 3, may be applied to User Group 1. Thus, users in User Group 1 would be permitted to view Field 1, which is specifically restricted for viewing by users in User Group 1, and Fields 4-6, which are not restricted fields. Restriction Groups 2 and 3, but not Restriction Group 1, are applied to User Group 2. Thus, users in User Group 2 would be permitted to view Fields 0, 2, and 3, which are specifically restricted for viewing by users in User Group 2, and Fields 4-6, which are not restricted fields.

Figure 5B:
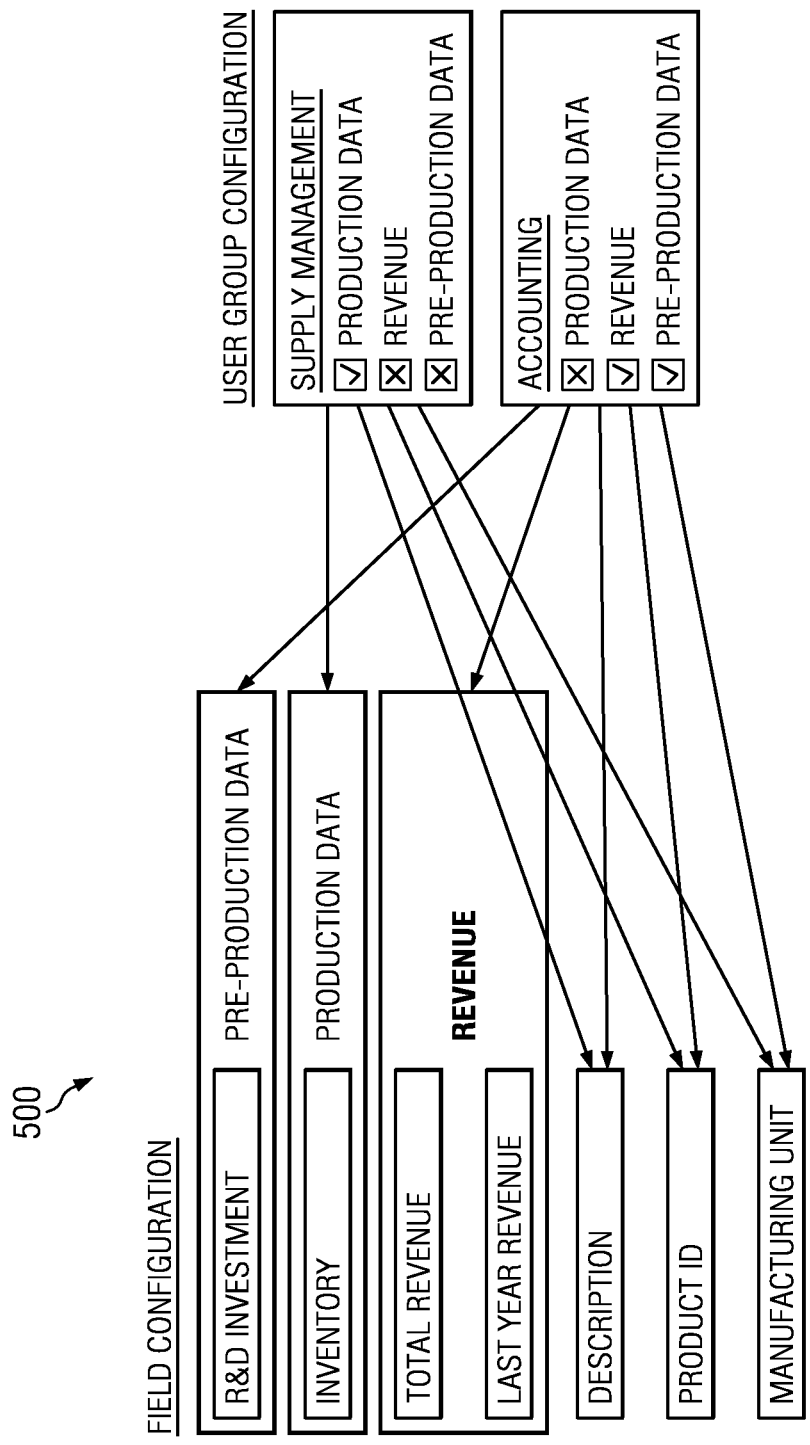
FIG. 5B depicts a diagram illustrating an exemplary field level security configuration.

FIG. 5B depicts an example of asset 500. Following the above example, users in the Supply Management group would be permitted to view the restricted field 'Inventory' per the restriction class of 'Production Data' as well as unrestricted fields such as 'Description', 'Product ID', and 'Manufacturing Unit'. However, they cannot view the restricted fields of 'R&D Investment', 'Total Revenue', and 'Last Year Revenue' because the restriction classes 'Pre-Production Data' and 'Revenue' do not apply to this group. Likewise, users in the Accounting group would be permitted to view the restricted fields 'R&D Investment', 'Total Revenue', and 'Last Year Revenue' and the unrestricted fields 'Description', 'Product ID', and 'Manufacturing Unit', but they cannot view the restricted field 'Inventory' because the restriction class of 'Production Data' does not apply to this group of users.

In some embodiments, field restrictions are stored in a database with the metadata but in a separate table. FIG. 6 diagrammatically illustrates example relationships between a plurality of tables storing user groups 610, field restrictions 630, mappings 620 between user groups 610 and field restrictions 630, and metadata fields 640.

In one embodiment, the Field_Restrictions table defines the restriction classes used by the media management tool to restrict fields and user groups. In one embodiment, table 630 may contain the three example restriction classes of Restricted Class 1, Restricted Class 2, and Restricted Class 3. An administrator can use an embodiment of the media management tool to edit, add, or delete these classes to suit. In one embodiment, the Field_Restrictions table contains the following columns (of which only the first two may be required):

| Column | Description |
| --- | --- |
| FIELD_RESTRICTION_ID numeric (PK) | Field restriction id. |
| NAME varchar(100) (Unique Key) | Name of the restriction. No two restrictions can have the same name. This is the label for the restriction class. |
| DESCR varchar(249) | Description of the restriction. |
| CREATE_DT date | Date created. |
| CREATE_ID varchar(80) | ID of the user who created this restriction. |
| UPDATE_DT date | Date updated. |
| UPDATE_ID varchar(80) | ID of the user who updated this restriction. |

In some embodiments, a check is performed on a digital asset to see if the digital asset has any associated restrictions on its metadata. If no restriction is specified, the digital asset may be unrestricted, and retrieval of a field does not require any check for a user. In some embodiments, a default field restriction can be applied or provided when no field restriction value is selected.

In some embodiments, metadata-related Application Programming Interfaces (APIs) can take into account an identifier associated with a user and filter the restricted fields at the API level. For example, an API may be configured to check whether a particular user belonging to a certain group searching for a restricted field is allowed to view that field and either block or allow the user to view the restricted field. In some embodiments, a metadata editor can be configured to allow an authorized user or administrator to set field restrictions utilizing various metadata models.

Embodiments disclosed herein may provide ways of searching restricted and unrestricted fields. Searching may be field or keyword based. In field searching, a user selects a field to be searched. Keyword searching may be performed across assets. In some embodiments, if a user requests a keyword search that is present in unrestricted fields and also in a restricted field, the system can return to the user the asset and the unrestricted fields, but without the restricted field(s). In some embodiments, if a keyword is present only in a restricted field for an asset, the user might not be able to see the asset.

In keyword searching, a search may be executed across both restricted and unrestricted fields. Implementation may be performed by creating an index across all metadata fields. These metadata fields may contain various types of metadata. Example types of metadata may include scalar metadata, drop-down metadata, type-ahead metadata, and tabular metadata, etc. As part of the index, each occurrence of a word may be indexed, along with a field associated with each occurrence. As an example, for a keyword search, a global list can first be created of all the fields that are configured as searchable through a keyword search. The search can be qualified through a set of restricted fields. If there are any restricted fields for a given user, these fields can be filtered out from the global list. In accessing the digital asset, the user may view non-restricted fields as well as any restricted field that the user is permitted to view, but the user may not be aware of any restricted fields that the user is not permitted to view.

In some embodiments, when a user initiates a keyword search, the system first looks at a user identifier to determine a restriction level, a restricted class in which the user resides, or otherwise identifies a subset of the global list that includes only those fields searchable by the user is returned. The user is able to conduct a search, and the system is able to search only non-restricted fields or may search the global list and only return results for the subset. Access to the digital asset by the user may be unaffected.

Figure 7A:
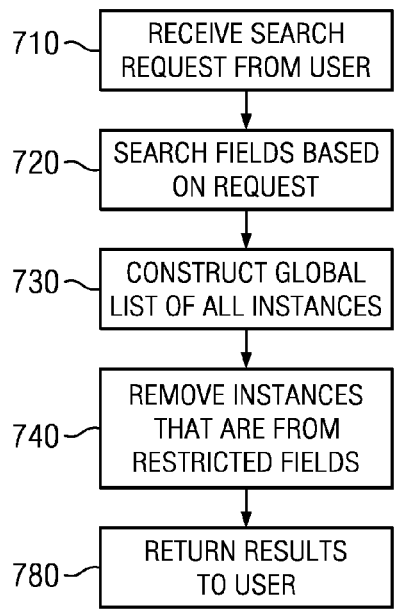
FIGS. 7A-7B depict flow diagrams illustrating example methods for searching across restricted and unrestricted fields.

FIG. 7A depicts a flow diagram illustrating an example embodiment of a method for searching restricted and unrestricted fields. In the context of this disclosure, these fields contain metadata associated with digital assets. In step 710, system 100 receives a request from a user. In step 720, system 720 searches all fields based on the request. In step 730, system 100 constructs a global list of all instances. In step 740, system 100 removes all instances that are from restricted fields. In some embodiments, step 740 may involve the creation of a second list comprising only instances that are not from restricted fields. In some embodiments, step 740 may involve deleting or otherwise removing instances from the global list. In step 780, results are returned to the user.

Figure 7B:
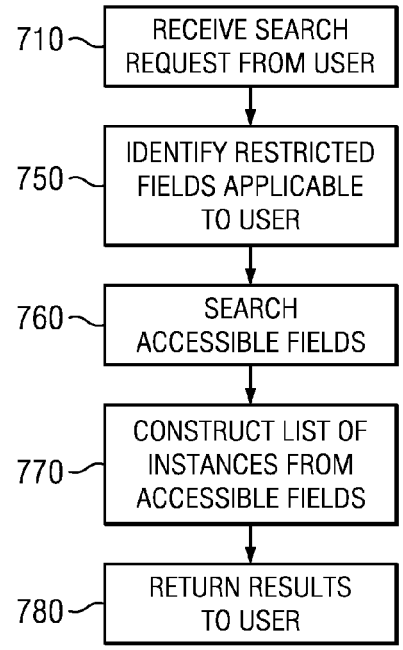

FIG. 7B depicts a flow diagram illustrating another example embodiment of a method for searching restricted and unrestricted fields. In step 710, system 100 receives a request from computer 110A. In step 720, system 100 identifies restricted fields that are applicable to the user. In step 760, system 100 searches only fields that are accessible to the user, including unrestricted fields and restricted fields to which the user is authorized to access. In step 770, system 100 constructs a list from instances in the accessible fields. In step 780, results are returned to the user.

Figure 8:
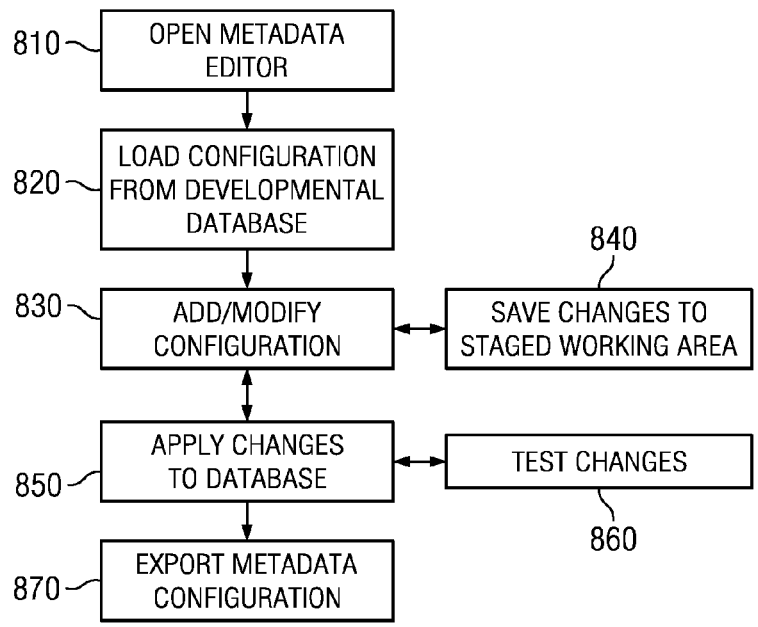
FIG. 8 depicts a flow diagram illustrating an example method for metadata management.
Figure 9:
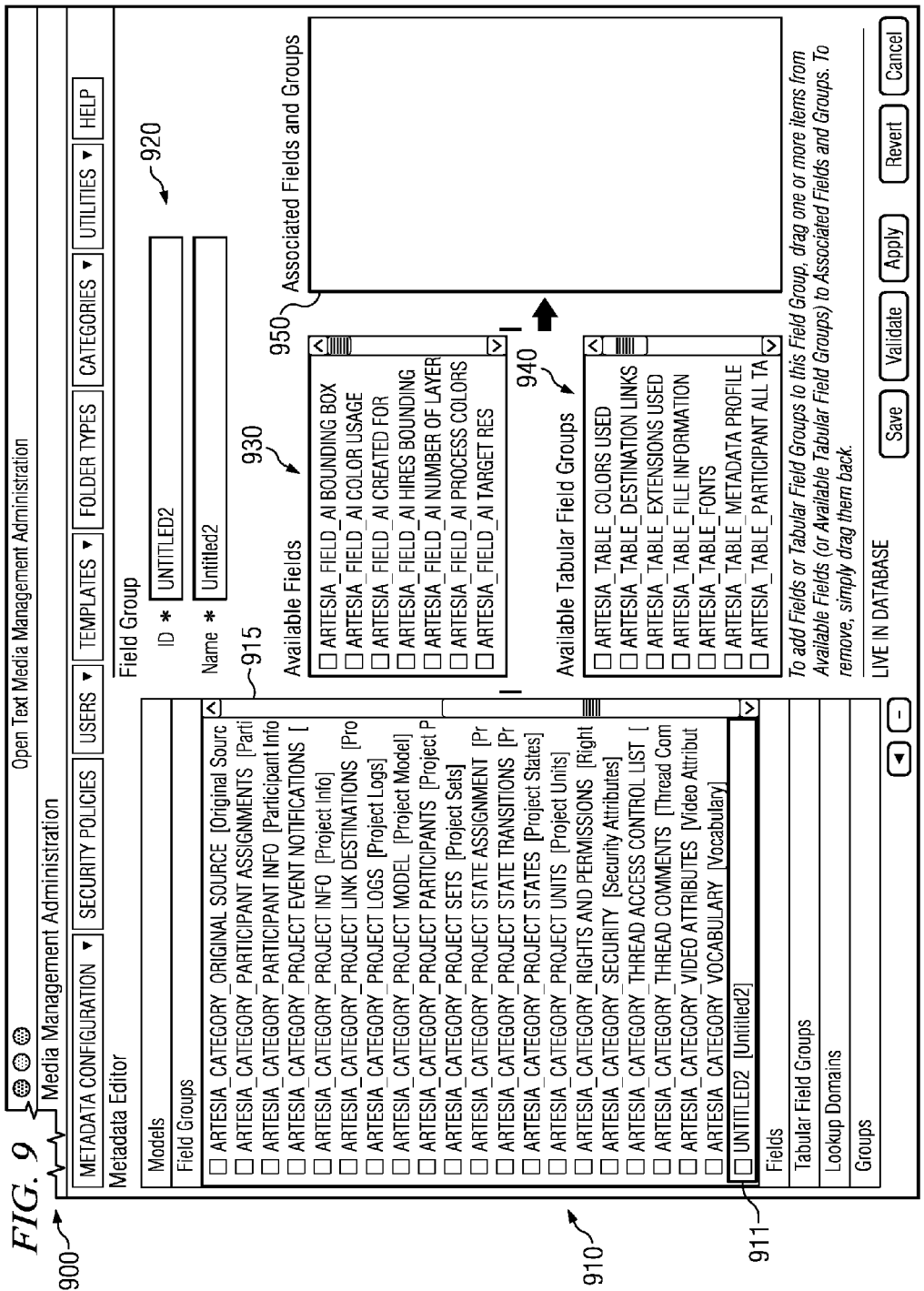
FIGS. 9 and 10 depict graphical representations of a user interface implementing metadata management functions.
Figure 10:
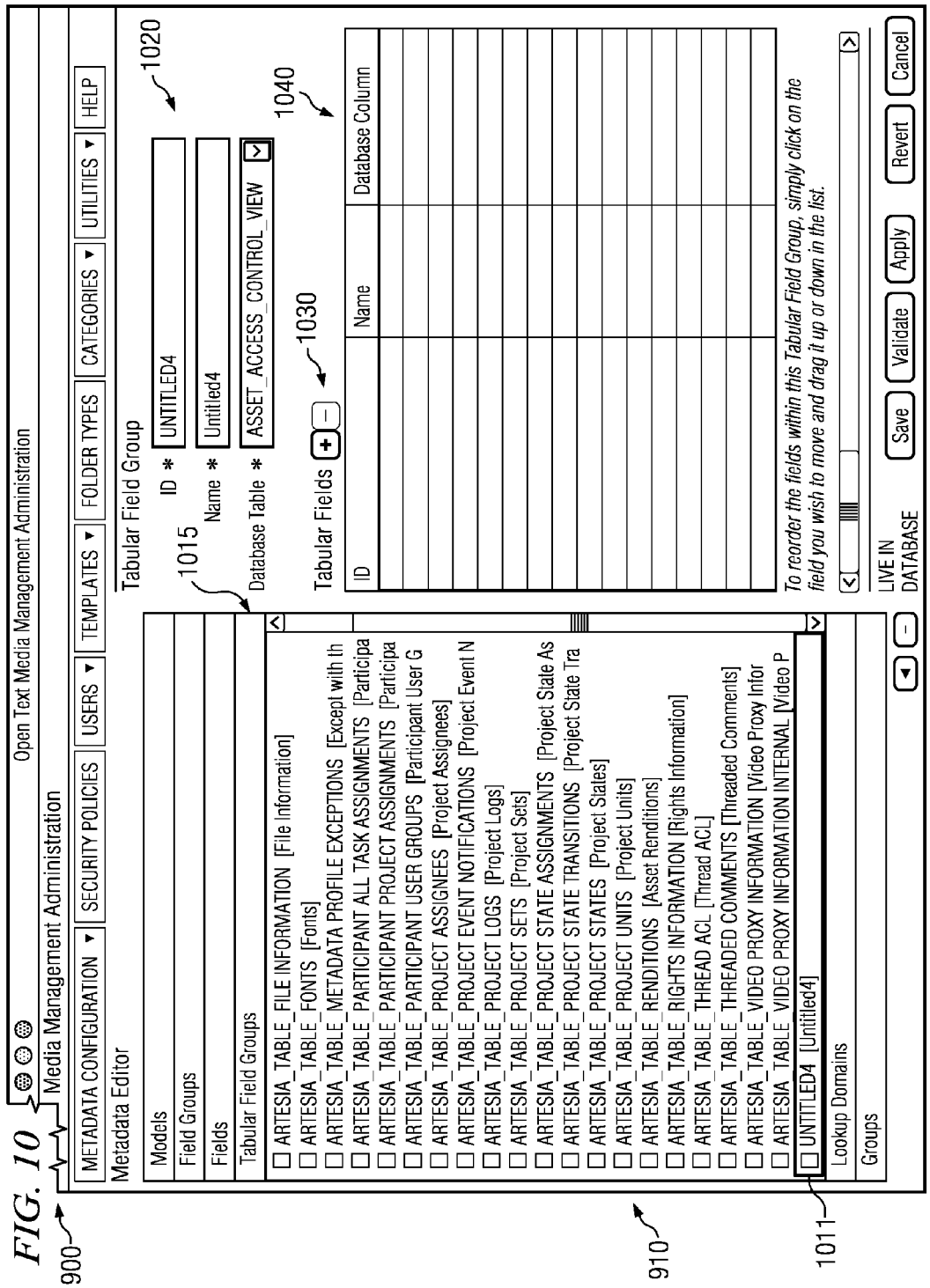

FIG. 8 depicts a flow diagram illustrating an example embodiment of a method for metadata management. In step 810, a metadata editor application is opened. In step 820, a configuration may be loaded from a developmental database. In steps 830 and 840, the configuration may be modified or added to and changes stored to a staged working area. In steps 850 and 860, changes may be applied to a database and tested. The process may return to steps 830 and 840 as needed. Once the configuration is in an approved state, step 870 may allow exportation of the metadata configuration. FIGS. 9 and 10 depict graphical representations of a user interface illustrating how a metadata configuration may be modified.

As depicted in FIG. 9, media management tool 900 may include several components including Metadata Editor 910 for modifying a metadata configuration. An administrator may select Field Group 911 from Field Groups 915. In response, Metadata Editor 910 may display ID and name input boxes 920 and automatically populate Available Fields 930 and Available Tabular Field Groups 940 with appropriate choices. The administrator may drag and drop items from Available Fields 930 and Available Tabular Field Groups 940 to Associated Fields and Groups 950 or drag them back to remove items from Associated Fields and Groups 950 as desired.

As depicted in FIG. 10, Metadata Editor 910 of media management tool 900 may further include Tabular Field Groups function 1015 from which Tabular Field Group 1011 may be selected. In response, Metadata Editor 910 may display ID and name input boxes 1020 and operate to present built-in entry form 1040. Items may be added to be associated with Tabular Field Group 1011 and fields within this Tabular Field Group may be moved up or down as desired using, for example, toggle button 1030.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium " is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system, comprising:
 a metadata editor, embodied on non-transitory computer memory including instructions executable by a computer processor to cause the metadata editor to:
  display on a user interface a metadata record of properties associated with a digital asset in a network, the metadata record having one or more metadata fields, a first metadata field of the one or more metadata fields having a plurality of configuration parameters, a first configuration parameter of the plurality of configuration parameters selectable for applying a restriction to the first metadata field of the one or more metadata fields in the metadata record of the digital asset, the restriction specifying one or more user groups in the network; and
  in response to a first user applying the restriction via the user interface, setting the first metadata field of the one or more metadata fields in the metadata record of the digital asset as a restricted field viewable only by one or more user groups in the network.

2. The system of claim 1, wherein the metadata editor further comprises a lookup domain function configured to enable the first user to define a period of time during which the digital asset is accessible.

3. The system of claim 1, wherein the metadata editor further comprises a metadata field editing function configured to enable the first user to specify whether a metadata field is displayable, searchable, keyword searchable, editable, sortable, or a combination thereof.

4. The system of claim 1, wherein the media management functions further comprise a search function configured to enable end users in the network to search one or more types of metadata.

5. The system of claim 4, wherein the search function comprises a keyword search function configured to identify metadata fields specified as being keyword searchable.

6. The system of claim 4, wherein the search function comprises a field search function configured to examine a restriction class associated with the restriction and search metadata fields associated with the restriction class.

7. The system of claim 1, wherein the metadata editor further comprises a tabular field editing function configured to enable the first user to edit tabular fields for one or more database columns.

8. A method of applying field level security to digital assets, the method comprising:
 providing a metadata editor embodied on a computer having a processor and a memory;
 displaying, by the metadata editor on a user interface, a metadata record of properties associated with a digital asset in a network, the metadata record having one or more metadata fields, a first metadata field of the one or more metadata fields having a plurality of configuration parameters, a first configuration parameter of the plurality of configuration parameters selectable for applying a restriction to the first metadata field of the one or more metadata fields in the metadata record of the digital asset, the restriction specifying one or more user groups in the network;
 in response to a first user apply the restriction via the user interface, the metadata editor setting the first metadata field of the one or more metadata fields in the metadata record of the digital asset as a restricted field viewable only by the one or more user groups in the network.

9. The method according to claim 8, further comprising:
 providing the first user with a lookup domain function via the user interface, the lookup domain function being configured to enable the first user to define a period of time during which the digital asset is accessible.

10. The method according to claim 8, further comprising:
 providing a metadata field editing function via the user interface, the metadata field editing function being configured to enable the first user to specify whether a metadata field is displayable, searchable, keyword searchable, editable, sortable, or a combination thereof.

11. The method according to claim 8, further comprising:
 providing a search function via the user interface, the search function being configured to enable end users in the network to search one or more types of metadata.

12. The method according to claim 11, wherein the search function comprises a keyword search function configured to identify metadata fields specified as being keyword searchable.

13. The method according to claim 11, wherein the search function comprises a field search function configured to examine a restriction class associated with the restriction and search metadata fields associated with the restriction class.

14. The method according to claim 8, further comprising:
 providing a tabular field editing function configured to enable the first user to edit tabular fields for one or more database columns.

15. A computer program product comprising at least one non-transitory computer readable medium storing instructions translatable by one or more computing devices to provide a metadata editor, the instructions when translated by the one or more computing devices cause the metadata editor to:
 display on a user interface a metadata record of properties associated with a digital asset in a network, the metadata record having one or more metadata fields, a first metadata field of the one or more metadata fields having a plurality of configuration parameters, a first configuration parameter of the plurality of configuration parameters selectable for applying a restriction to the first metadata field of the one or more metadata fields in the metadata record of the digital asset, the restriction specifying one or more user groups in the network; and in response to a first user applying the restriction via the user interface, setting the first metadata field of the one or more metadata fields in the metadata record of the digital asset as a restricted field viewable only by one or more user groups in the network.

16. The computer program product of claim 15, wherein the instructions are further translatable by the one or more computing devices to provide the first user with a lookup domain function via the user interface, the lookup domain function being configured to enable the first user to define a period of time during which the digital asset is accessible.

17. The computer program product of claim 15, wherein the instructions are further translatable by the one or more computing devices to provide a metadata field editing function via the user interface, the metadata field editing function being configured to enable the first user to specify whether a metadata field is displayable, searchable, keyword searchable, editable, sortable, or a combination thereof.

18. The computer program product of claim 15, wherein the instructions are further translatable by the one or more computing devices to provide a search function via the user interface, the search function being configured to enable end users in the network to search one or more types of metadata.

19. The computer program product of claim 18, wherein the search function comprises a field search function configured to examine a restriction class associated with the restriction and search metadata fields associated with the restriction class.

20. The computer program product of claim 15, wherein the instructions are further translatable by the one or more computing devices to provide a tabular field editing function configured to enable the first user to edit tabular fields for one or more database columns.

21. A system, comprising:
at least one processor; and
a metadata editor embodied on non-transitory computer memory including instructions executable by the at least one processor to cause the metadata editor to:
 display on a user interface a plurality of tabular metadata fields associated with a digital asset in a network, a first tabular metadata field of the plurality of tabular metadata fields having a plurality of configuration parameters, a first configuration parameter of the plurality of configuration parameters selectable for applying a restriction to the first tabular metadata field of the plurality of tabular metadata fields, the restriction specifying one or more user groups in the network;
 in response to a first user applying the restriction via the user interface, setting the first tabular metadata field of the plurality of tabular metadata fields as a restricted field viewable only by one or more user groups in the network; and
 provide a tabular field editing function to enable the first user to edit the plurality of tabular metadata fields containing tabular metadata about the digital asset.

* * * * *